J. A. HOLLAND.
MECHANICAL SCRAPER.
APPLICATION FILED APR. 10, 1919.
1,341,369.
Patented May 25, 1920.
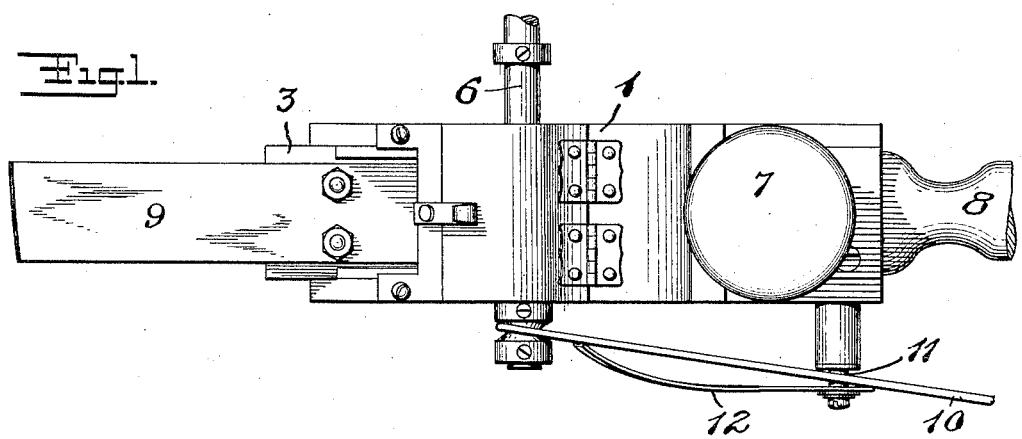
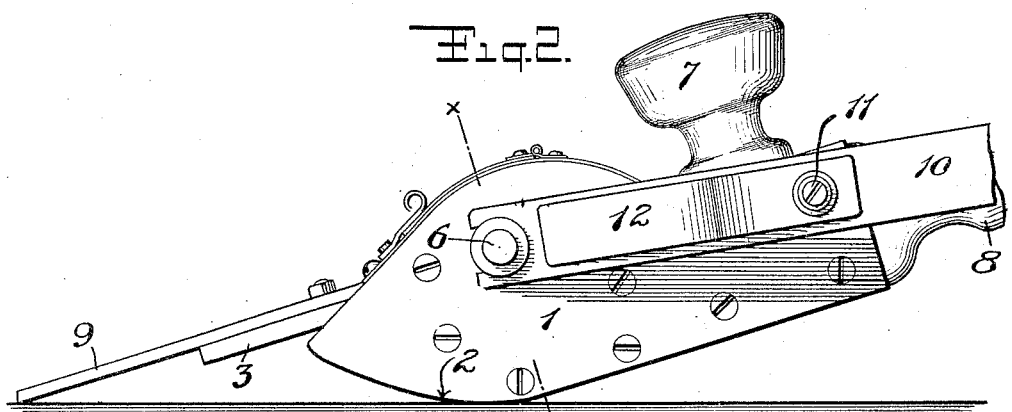
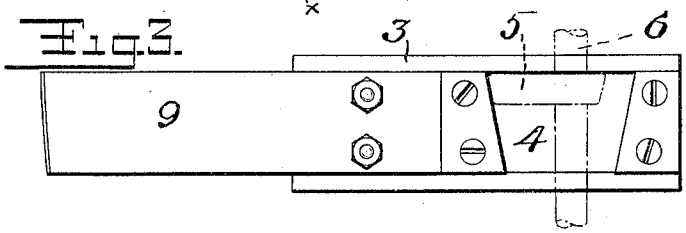
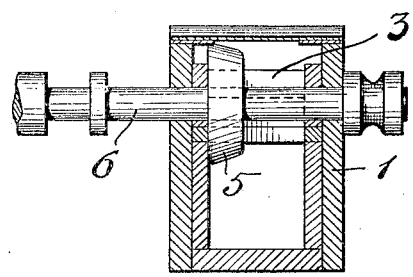
INVENTOR
Joseph A. Holland
BY
Mitchell & Allyn
ATTORNEY

UNITED STATES PATENT OFFICE.

JOSEPH A. HOLLAND, OF BROOKLYN, NEW YORK, ASSIGNOR TO NELSON W. DINGWALL, OF MOUNT VERNON, NEW YORK.

MECHANICAL SCRAPER.

1,341,369.

Specification of Letters Patent.

Patented May 25, 1920.

Application filed April 10, 1919. Serial No. 289,023.

*To all whom it may concern:*

Be it known that I, JOSEPH A. HOLLAND, a citizen of the United States of America, residing at Brooklyn, New York, have invented a new and useful Mechanical Scraper, of which the following is a specification.

This invention relates to scraping and polishing tools and is particularly useful in connection with a tool designed to scrape and finish surface plates and the ways of shapers, planers and machine tools generally. It can also be used for frosting surfaces also for scraping off scale on plates.

In the drawing:

Figure 1 is a plan view of my invention.

Fig. 2 is a side elevation thereof.

Fig. 3 is a detail view.

Fig. 4 is a sectional view on the line x—x of Fig. 2.

1 represents the main body or housing which may be constructed in any suitable way and which is provided on its lower side with a curved sole 2 which is preferably highly finished or polished so that it will not scratch or injure any surface upon which it rests. 3 is a tool carrier mounted in the front end of the housing 1 in suitable ways and arranged to be reciprocated to and fro. Near the inner end of the cutter carrier 3 is a recess or opening 4 in which is located a cam 5 which is mounted upon a shaft 6, which shaft is mounted transversely in the housing 1. The front and rear walls of the recess 4 in the cutter carrier are preferably oppositely inclined as best seen in Fig. 3 so that the length of the recess will be greater at one side than at the other for the purpose hereinafter described. 7 is a handle on top of the housing 1 upon which one hand of the operator may be placed to hold the tool down into operative position on the plate or surface being operated on. 8 is a handle projecting rearwardly from the housing 1 for receiving the other hand of the operator. 9 is a cutting tool or scraper which may be detachably secured to the carrier 3 in any desired manner and by any suitable means. Any suitable means may be provided for rotating the shaft 6 to rotate the cam 5. When the cam stands in the longer portion of the recess 4 as indicated in Fig. 3, the reciprocating stroke of the carrier 3 and tool 9 will be relatively short. If, however, the cam is shifted laterally toward the opposite and shorter side of the recess 4, it will engage a higher part of the inclined surfaces at the front and rear thereof and will therefore impart a relatively longer stroke to the tool 9. The shaft 6 upon which the cam is mounted may slide in its bearings in the housing 1 for the purpose of shifting the cam laterally, and any suitable means may be provided to effect this shifting movement. For example, I may provide a forked lever 10 pivoted at 11 on the rear end of the housing so that the operator by swinging the lever 10 may shift at will the operative position of the shaft 6 and cam 5. 12 is a spring which may be provided to normally shift the lever 10 into the short stroke position wherein the cam 5 will stand as shown in Fig. 3.

In operation, the user places the curved sole 2 of the housing 1 upon the surface to be worked upon in the manner shown in Fig. 2. Then, by rocking or canting the body forwardly the tool or scraper 9 may be brought into contact with the surface in advance of the tool. As the shaft 6 revolves, the cutting edge of the tool 9 is caused to rapidly reciprocate on the surface so as to scrape the same to the desired degree. The working pressure of the cutting edge on the surface may be varied at will by simply canting the tool more or less on the supporting surface. Not only does the curved sole enable the operative pressure of the cutting edge to be varied, since it permits of the rocking of the tool on the supporting surface, but the frictional resistance between the sole and the supporting surface tends to resist any to and fro sliding movement and therefore relieves much of the strain or shock of the work on the operator. This frictional resistance may be increased by pressing down more firmly on the handle 7 and this may be done fearlessly and without danger of injury to the highly finished surface on which the tool is resting because, by reason of the curved supporting sole, any sliding action of the tool on such a surface will have no bad effect, but in fact will tend to burnish and improve the same.

What I claim is:

1. In a tool of the character described, a main body having a curved supporting sole arranged to rest upon the surface to be scraped, a reciprocating tool carrier mounted in said body, means for reciprocating the same, means for securing a tool on said carrier in position whereby the operative end of the tool may rest upon the work in advance of the said sole.

2. In a scraping tool of the character described, a main body or housing, a curved supporting sole portion arranged to rest upon the surface to be scraped whereby the main body to be canted fore and aft to vary the working pressure of said tool, a tool carrier mounted to reciprocate in said housing and to carry a forwardly projecting tool in advance of said housing, and means to reciprocate said carrier.

3. In a tool of the character described, a main body having a curved supporting sole arranged to rest upon the surface to be scraped, a reciprocating tool carrier mounted in said body, means for reciprocating the same, means for securing a tool on said carrier in position whereby the operative end of the tool may rest upon the work in advance of the said sole, and means for varying the degree of reciprocal movement of the tool carrier.

4. In a scraping tool of the character described, a main body or housing, a curved supporting sole portion arranged to rest upon the surface to be scraped to permit the main body to be canted fore and aft to vary the working pressure of said tool, a tool carrier mounted to reciprocate in said housing and to carry a forwardly projecting tool in advance of said housing, and means to reciprocate said carrier comprising a cam.

5. In a scraping tool of the character described, a main body or housing, a curved supporting sole portion arranged to rest upon the surface to be scraped to permit the main body to be canted fore and aft to vary the working pressure of said tool, a tool carrier mounted to reciprocate in said housing and to carry a forwardly projecting tool in advance of said housing, and means to reciprocate said carrier comprising a cam, a shaft mounted transversely in said housing and carrying said cam.

6. In a scraping tool of the character described, a main body having a sole portion adapted to rest upon a surface and upon which said body may be rocked to and fro without injury to said surface and to vary the working pressure of said tool, a tool carrier mounted to reciprocate in said body, with means for securing a tool thereto arranged to project forwardly from said body and in advance of said sole, means for reciprocating said tool carrier longitudinally to and fro relatively to said body.

7. In a tool of the character described, a main body having a supporting sole arranged to rest on the surface to be scraped, a reciprocating tool carrier mounted in said body, means for reciprocating the same, means for securing a tool to said carrier in position whereby the operative end of the tool may engage the surface in advance of that part of the surface upon which the sole is resting.

JOSEPH A. HOLLAND.